United States Patent
Betz (10) Patent No.: US 11,046,284 B2
(45) Date of Patent: Jun. 29, 2021

(54) FORCE LIMITER

(71) Applicant: TRW Automotive GmbH, Alfdorf (DE)

(72) Inventor: Hans-Peter Betz, Böbingen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 32 days.

(21) Appl. No.: 16/468,718

(22) PCT Filed: Dec. 12, 2017

(86) PCT No.: PCT/EP2017/082313
§ 371 (c)(1),
(2) Date: Jun. 12, 2019

(87) PCT Pub. No.: WO2018/108857
PCT Pub. Date: Jun. 21, 2018

(65) Prior Publication Data
US 2019/0351866 A1    Nov. 21, 2019

(30) Foreign Application Priority Data

Dec. 16, 2016 (DE) .......................... 102016124661.1

(51) Int. Cl.
*B60R 22/18* (2006.01)
*B60R 22/28* (2006.01)

(52) U.S. Cl.
CPC .............. *B60R 22/18* (2013.01); *B60R 22/28* (2013.01); *B60R 2022/1806* (2013.01); *B60R 2022/281* (2013.01); *B60R 2022/286* (2013.01)

(58) Field of Classification Search
CPC . B60R 22/18; B60R 22/28; B60R 2022/1806; B60R 2022/286; B60R 2022/281
USPC ........................................................ 280/806
See application file for complete search history.

(56) References Cited

U.S. PATENT DOCUMENTS

| 3,026,972 | A | 3/1962 | Hendry et al. |
| 5,069,482 | A | 12/1991 | Fohl |
| 5,480,190 | A | 1/1996 | Fohl |
| 5,588,677 | A * | 12/1996 | Kopetzky ........... B60R 22/1952 280/806 |
| 5,664,807 | A | 9/1997 | Bohmler |
| 6,076,856 | A * | 6/2000 | Wang .................. B60R 22/1952 280/806 |
| 6,135,564 | A | 10/2000 | Betz |
| 6,712,394 | B2 * | 3/2004 | Betz .................... B60R 22/1952 188/374 |
| 7,631,900 | B2 * | 12/2009 | Nakayama .......... B60R 22/1952 280/806 |
| 8,210,569 | B2 * | 7/2012 | Eberle ................. B60R 22/1952 280/806 |

(Continued)

FOREIGN PATENT DOCUMENTS

| DE | 10164069 | 10/2002 |
| DE | 20218869 | 4/2003 |

*Primary Examiner* — Faye M Fleming
(74) *Attorney, Agent, or Firm* — Tarolli, Sundheim, Covell & Tummino LLP (57) ABSTRACT

A force limiting device (10) for a seat belt comprises a fitting (14), a tension transfer means (36) and a deformation member (12) directly abutting on the fitting (14), wherein the fitting (14, 114) comprises a deflection unit (20, 120) in the form of a deflection pulley for the tension transfer means (36, 136).

20 Claims, 7 Drawing Sheets

(56) References Cited

U.S. PATENT DOCUMENTS

| | | | |
|---|---|---|---|
| 9,238,447 B2 * | 1/2016 | Hoika | B60R 22/20 |
| 9,821,758 B2 * | 11/2017 | Jaradi | B60R 22/28 |
| 2002/0113425 A1 | 8/2002 | Betz et al. | |
| 2003/0122362 A1 * | 7/2003 | Ukita | B60R 22/1952 |
| | | | 280/806 |
| 2019/0344746 A1 * | 11/2019 | Moeker | B60R 22/28 |
| 2020/0130636 A1 * | 4/2020 | Moeker | B60R 22/1952 |

* cited by examiner

FORCE LIMITER

RELATED APPLICATIONS

This application corresponds to PCT/EP2017/082313, filed Dec. 12, 2017, which claims the benefit of German Application No. 10 2016 124 661.1, filed Dec. 16, 2016, the subject matter of which are incorporated herein by reference in their entirety.

BACKGROUND OF THE INVENTION

The invention relates to a force limiting device for a seat belt.

A force limiting device has the function of reducing load peaks in a seat belt system during forward movement of a vehicle occupant in the case of vehicle crash. What is especially efficient is the use of said force limiting device in combination with a belt tensioner which eliminates the belt slack before the vehicle occupant starts to move forward. Said belt tensioner is illustrated in DE 201 02 758 U1, for example.

The drawback of said belt tensioners are the high costs incurred by the plurality of additional component parts that are required for the belt-tensioning function, for example for a pyrotechnical drive. Further, a relatively large construction space is required to accommodate said component parts and to ensure safe functioning of the belt tensioner.

SUMMARY OF THE INVENTION

It is the object of the invention to provide a force limiting device which can be manufactured at low cost and has a compact design.

For achieving the object, a force limiting device for a seat belt is provided comprising a fitting, a tension transfer means and a deformation member which directly abuts on the fitting, wherein the fitting includes a deflection unit in the form of a deflection pulley for the tension transfer means. Accordingly, the force limiting device especially has no belt tensioning unit. As a belt tensioning unit is dispensed with, the deformation member can be disposed directly adjacent to the fitting, thus enabling a very compact structure of the force limiting device. In accordance with the invention, "directly adjacent" is understood in such way that no complex component parts or subassemblies are provided between the deformation member and the fitting. However, a small connecting element may be provided between the deformation member and the fitting, for example a washer, a spring element or a damping element, but no larger and/or more complex component parts or subassemblies, especially no complex belt tensioning unit. Further, dispensing with the belt tensioning unit helps to significantly reduce the manufacturing costs.

Preferably, the deformation member is fastened directly to the fitting. In this way, the functionality of the force limiting device is ensured. In addition, this entails advantages in logistics and in manufacture, as the force limiting device may be supplied in fewer single parts and the deformation member cannot get lost.

The deformation member may include a connecting element by which it is fastened to the fitting, thus allowing the connection of the deformation member and the fitting to be configured more advantageously, especially in an easier and/or more stable manner.

In accordance with a preferred embodiment, the deformation member includes a deformation tube and a displacing unit, the displacing unit being connected to the tension transfer means and being adapted to penetrate the deformation tube while plastically deforming the latter. In this manner, kinetic energy transmitted by the tension transfer means may be converted to energy for deforming the deformation tube, which helps to reduce load peaks in the seat belt system.

According to another preferred embodiment, the deformation tube has a first end including an extension and a second end by which it is connected to the fitting, wherein the displacing unit acts upon the extension in the non-deformed state of the deformation tube. In this way, the displacing unit is safely supported on the deformation tube and, due to the extension, may penetrate the deformation tube in a directed manner. This ensures the deformation tube to deform in the predefined way in the case of use. In particular, this prevents the displacing unit from getting hooked at the second end of the deformation tube in a way impairing the functionality of the force limiting device.

The tension transfer means may extend through the deformation tube, which allows to easily use the entire deformation tube for deformation. Furthermore, assembly is facilitated in this way, as the displacing unit can be attached more easily to the end of the tension transfer means, if the tension transfer means is already arranged in the deformation tube.

Advantageously, the deformation tube is a seamlessly pressed tube made from aluminum material. Damage of the deformation tube due to the high forces and the high dynamics during force limitation exceeding the intended deformation is avoided in an especially advantageous manner, when the deformation tube is in the form of a chamber-pressed and subsequently drawn tube.

The tension transfer means may be a pull rope which is especially properly suited as a tension transfer means due to its properties such as flexibility, rupture strength and weight.

The fitting comprises a deflection unit for the tension transfer means. This offers the advantage that the direction of force may be deflected so that the deformation member may be arranged in various orientations without impairing the function of the force limiting device. At the same time, a deflection unit in the form of a deflection pulley ensures a uniform and, resp., homogenous force curve. Especially advantageously, the deflecting pulley is supported in plain bearings.

Moreover, a homogenous curve of force limitation may be advantageously achieved when the inner face of the deformation tube has a sliding coating.

In an advantageous embodiment, the force limiting device includes a belt transfer means, with the deformation tube being disposed coaxially relative to the belt transfer means. In accordance with the invention, especially an arrangement is meant in this context in which the belt transfer means is fastened to a portion of the tension transfer means and the deformation tube is arranged coaxially relative to said portion of the tension transfer means. Thus, the deformation tube is oriented especially in a direction corresponding to the direction of force at the belt transfer means when loaded by the seat belt.

In another advantageous embodiment, the force limiting device has a belt transfer means, the deformation tube being arranged at an angle α of from 30° to 120°, preferably of 90° with the belt transfer means. Accordingly, the axial axis of the deformation tube is oriented in a direction which deviates, especially by the angle α, from the direction of force at the belt transfer means when loaded by the seat belt. In this way, the design of the force limiting device may be adapted to different construction spaces and the force limiting device may have a compacter design.

It is of advantage when the tension transfer means is a pull rope and forms an eyelet to which a belt transfer means is fastened. In this way, the required construction space of the force limiting device can be reduced, as the belt transfer means can be hooked directly into the eyelet, for example. The fastening portion of the belt transfer means provided for fastening the belt transfer means to the eyelet may have a significantly compacter design than in the event that the fastening portion has to ensure safe fastening at one rope end of the tension transfer means.

Preferably, the first rope end and the second rope end of the tension transfer means are fastened directly to the displacing unit. Especially, the tension transfer means extends as a double rope through the deformation tube and downstream of the deflecting unit forms the eyelet that is provided for fastening the belt transfer means. As both rope ends are anchored in the displacing unit, in the case of use the load is distributed to the two rope sections connecting the eyelet to the displacing unit. Thus, the pull rope may be thinner and a possibly provided deflecting unit may be smaller so that the force limiting device requires less space.

BRIEF DESCRIPTION OF THE DRAWINGS

Further advantages and features will be resulting from the following description in connection with the attached drawings, wherein.

DESCRIPTION

Figure 1:
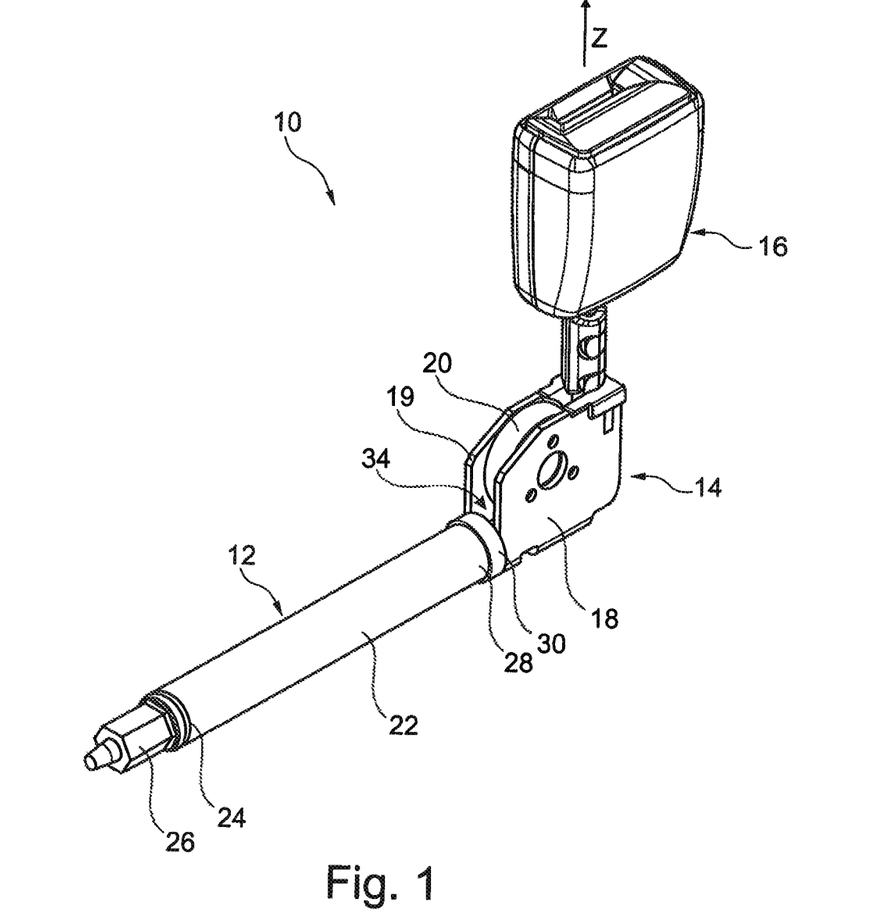
FIG. 1 shows a force limiting device according to the invention in a perspective view.

FIG. 1 illustrates a force limiting device 10 for a motor vehicle seat belt comprising a deformation member 12, a fitting 14 and a belt transfer means 16.

The belt transfer means 16 is a belt buckle. Alternatively, the belt transfer means 16 may be a belt deflector. In the case of use of the seat belt, the belt transfer means 16 is loaded in the direction of force Z.

The fitting 14 has a U-section including two opposed parallel sidewalls 18, 19 and comprises a deflection unit 20 in the form of a deflection pulley that is rotatably supported between the sidewalls 18, 19.

The fitting 14 is made from formed sheet and may be provided to fasten the force limiting device 10.

The deformation member 12 comprises a deformation tube 22 having a first end 24 at which a plug-shaped displacing unit 26 is arranged as well as a second end 28 at which a sleeve-shaped connecting element 30 is arranged.

The deformation member 12 is directly fastened to the fitting 14 via the connecting element 30. For this purpose, the connecting element 30 encloses the second end 28 of the deformation tube 22 and by a cylindrical section 32 (see FIG. 2) protrudes into a seat 34 formed by the two sidewalls 18, 19 of the fitting 14.

Figure 2:
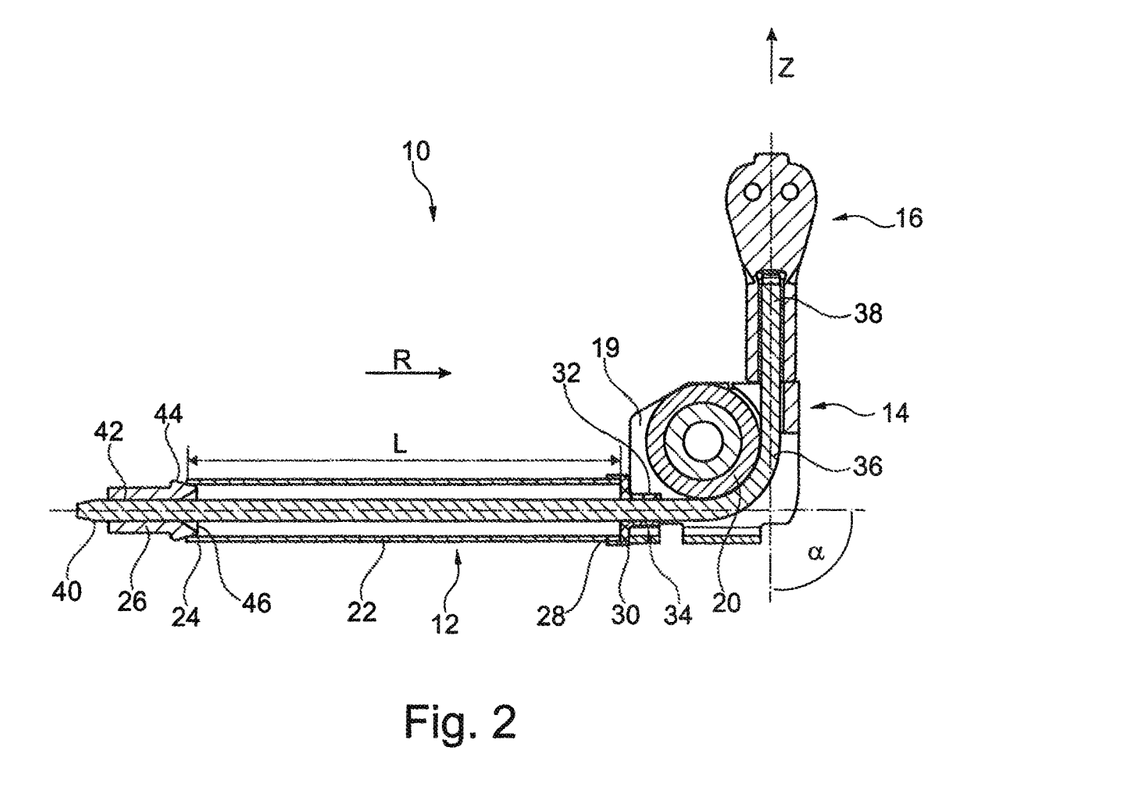
FIG. 2 shows the force limiting device of FIG. 1 in a home position in a sectional view.

The force limiting device 10 further comprises a tension transfer means 36 in the form of a pull rope (see FIG. 2). The tension transfer means 36 is fastened by a first rope end 38 to the belt transfer means 16, initially extends through the fitting 14, then through the entire deformation member 12 and is fastened to the displacing unit 26 by a second rope end 40 opposed to the first rope end 38. The tension transfer means 36 extends in the axial direction R through the connecting element 30, the deformation tube 22 and the displacing unit 26.

For this purpose, the displacing unit 26 has an axial bore 42 by means of which the displacing unit 26 may be slipped onto the tension transfer means 36. The displacing unit 26 may be press-fitted or adhesively bonded to the tension transfer means 36.

The belt transfer means 16 and the deformation tube 22 are arranged at the fitting 14 offset by an angle α of 90°. The deflecting unit 20 deflects the tension transfer means 36 and thus the force which in the case of use acts on the belt transfer means 16 and is transferred by the tension transfer means 36 about said angle α. Thus, the force is ensured to act on the deformation member 12 in the axial direction R and the force limiting device 10 is ensured to function as provided.

In an alternative embodiment (not shown), the belt transfer means 16 and the deformation tube 22 are arranged on opposite sides of the fitting 14. The tension transfer means 36 extends linearly through the fitting 14 so that the belt transfer means 16 and the deformation tube 22 are arranged coaxially relative to each other and, resp., to the tension transfer means 36 and no deflection unit 20 is required.

The deformation member 12 may be fastened to the fitting 14 by adhesive closure, for example by bonding or welding, and/or by force closure, for example by means of press-fit between the sidewalls 18, 19. Alternatively or additionally, the deformation member 12 may abut on and, resp., protrude into the fitting 14 by the connecting element 30, preferably by form closure, with the deformation member 12 being held in position via bias of the tension transfer means 36.

The displacing unit 26 has a conical portion 44 by which the displacing unit 26 rests on the first end 24 of the deformation tube 22. At the end 46 of the displacing unit 26 facing the deformation tube 22 the outer diameter of the conical portion 44 is at the most as large as the inner diameter of the deformation tube 22, while the maximum outer diameter of the conical portion 44 is larger than the inner diameter of the deformation tube 22. In this way, the displacing unit 26 protrudes partially into the deformation tube 22 so that it is safely supported. At the same time, the conical portion 44 of the displacing unit 26 abuts on the first end 24 of the deformation tube 22 and, in this way, may penetrate the deformation tube 22 in a directed manner in the axial direction R so as to plastically deform the latter.

Figure 3:
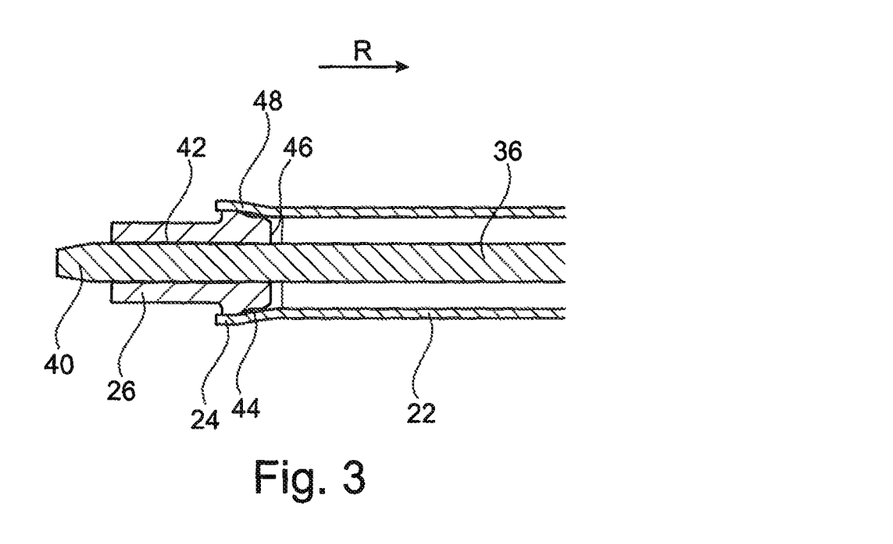
FIG. 3 shows a cutout of another embodiment of a force limiting device according to the invention in a sectional view.

The deformation tube 22 may have at its first end 24 an extension 48 (see FIG. 3) upon which the displacing unit 26 acts in the home position. The extension 48 is formed by a short portion of the deformation tube 22 having a larger inner diameter than the residual deformation tube 22. Thus, the displacing unit 26 is supported better at the first end 24 of the deformation tube 22 and may penetrate the same more easily in the axial direction R.

In the case of use of the seat belt, the belt transfer means 16 is pulled in the direction Z, said tensile force acting upon the displacing unit 26 via the tension transfer means 36. From a particular magnitude of the tensile force the displacing unit 26 penetrates the deformation tube 22 in the axial direction R and plastically deforms the latter, thus causing part of the kinetic energy of a passenger who falls into the seat belt during crash to be converted during the plastic deformation and consequently to be absorbed.

In FIG. 2, the force limiting device 10 is shown in the home position, i.e. in the position in which the force limiting device 10 has not yet released and the entire length L of the deformation tube 22 is available for plastic deformation.

Figure 4:
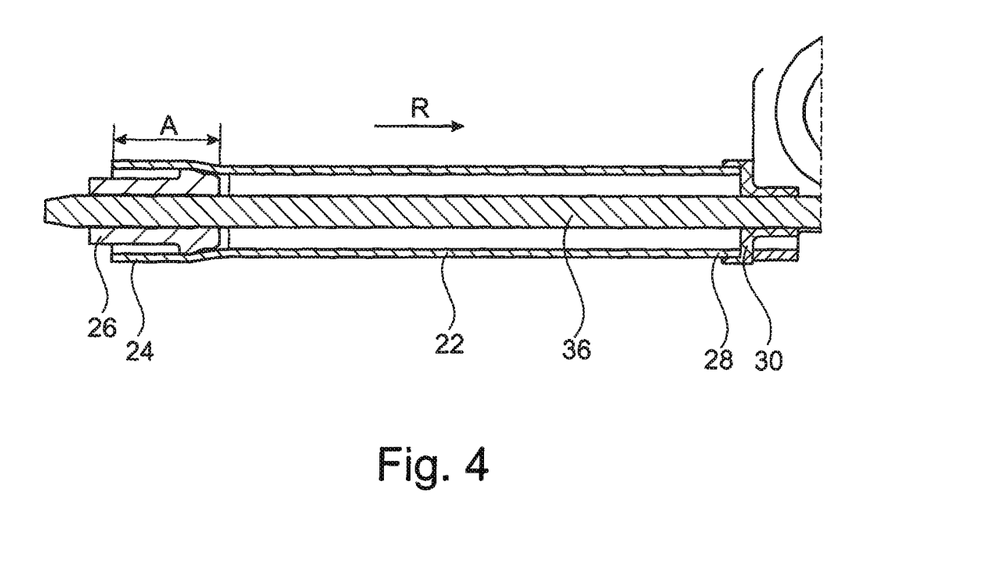
FIG. 4 shows the force limiting device of FIG. 1 in an intermediate position in a sectional view.

FIG. 4 illustrates an intermediate position in which the displacing unit 26 has penetrated the deformation tube 22 in the axial direction R and has deformed the latter along the distance A.

Figure 5:
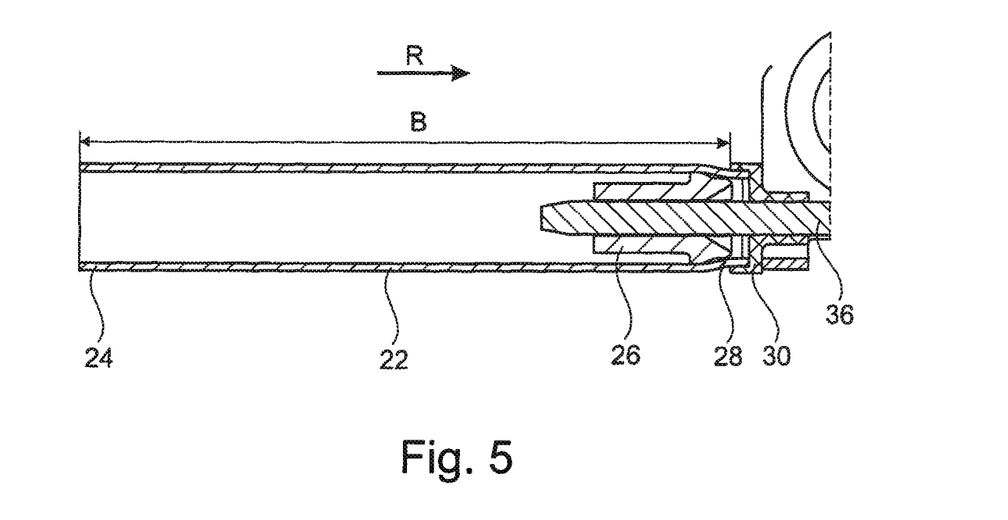
FIG. 5 shows the force limiting device of FIG. 1 in a final position in a sectional view.

FIG. 5 illustrates a final position in which the displacing unit 26 has substantially deformed the entire deformation tube 22 along the distance B. In order to deform the second end 28 of the deformation tube 22 protruding into the connecting element 30, higher force than during plastic deformation of the deformation tube 22 along the distance B is required, as in this case the connecting element 30 must be deformed in addition to the deformation tube 22.

Various force curves can be provided by the plastic deformation of the deformation tube 22 via the thickness of the wall, the inner diameter and the material of the deformation tube 22, on the one hand, as well as the maximum outer diameter of the displacing unit 26, on the other hand. Via the length L of the deformation tube 22 further the maximum distance of deformation as well as the maximum energy which can be converted by means of plastic deforming in the case of use can be adjusted.

In this manner, the passenger is decelerated by the yielding seat belt along the distance B in the case of use of the force limiting device 10, thus causing the force acting upon the passenger to be reduced.

The force limiting device 10 is not reusable. That is to say that, after the deformation tube 22 has been deformed, the force limiting device 10 must be replaced so as to provide the full performance of the force limiting device 10 again. In the event of a partially released force limiting device 10 (see FIG. 4) in which the deformation tube 22 has not been completely plastically deformed, the part which is not deformed continues being available for force limitation until replacement, however.

This very compact structure of the force limiting device 10 made from few single parts results in little construction space required for the force limiting device 10 and allows for manufacture at low cost.

Figure 6:
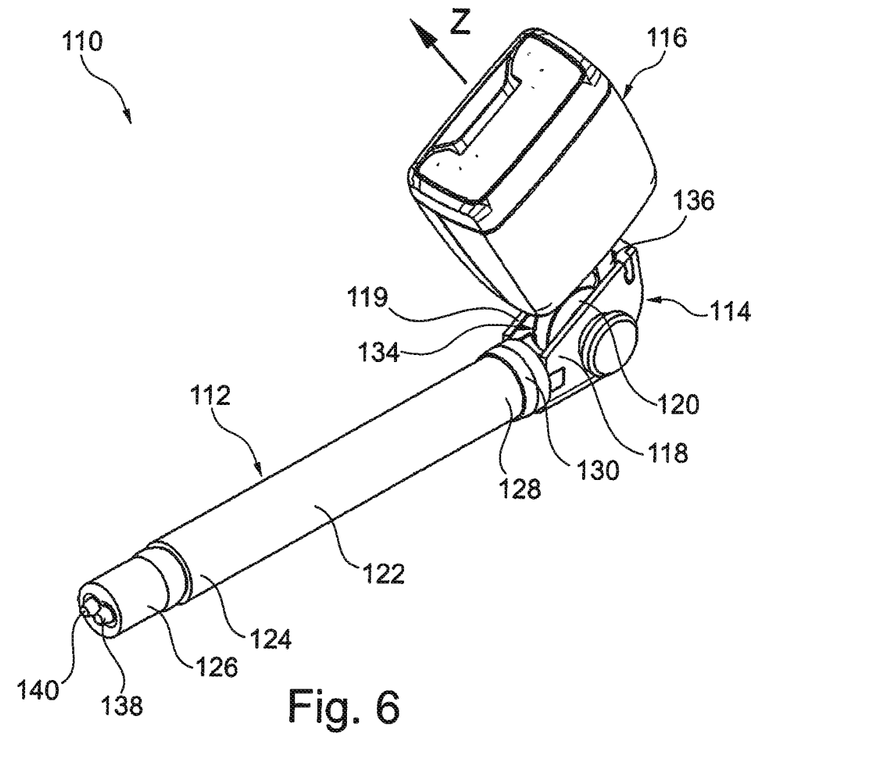
FIG. 6 shows a second embodiment of a force limiting device according to the invention in a perspective view.

In FIG. 6, a second embodiment of a force limiting device 110 according to the invention is illustrated which has a structure identical to the force limiting device 10 except for the differences stated in the following. Consequently, for like structures having like functions hereinafter corresponding reference numerals will be used.

The tension transfer means 136 of the force limiting device 110 is fastened to the displacing unit 126 by its first rope end 138 (see FIG. 7), initially extends through the entire deformation member 112, then through the fitting 114 and out of the fitting 114. From here the tension transfer means 136 leads into the fitting 114 again, wherein at this point outside the fitting 114 the tension transfer means 136 forms an eyelet 150, and with its second rope section extends, especially in parallel, adjacent to the second rope section through the fitting 114, then through the entire deformation member 112 and back to the displacing unit 126 at which the second rope end 140 is fastened (see FIG. 6). In this way, the tension transfer means 136 passes the deformation member 112 as well as the fitting 114 twice and forms a double rope pull 152 extending in the axial direction R through the connecting element 130, the deformation tube 122 and the displacing unit 126.

Figure 7:
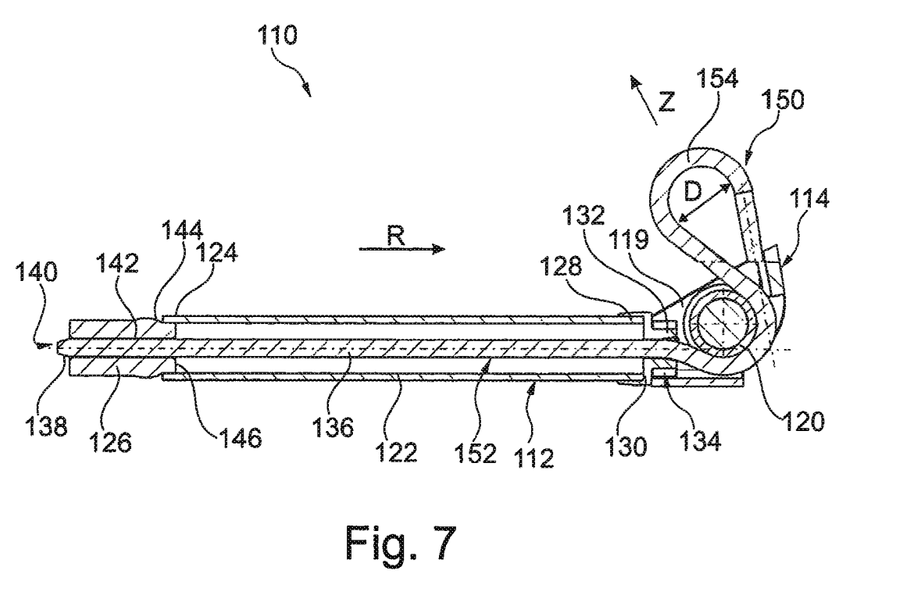
FIG. 7 shows the force limiting device of FIG. 6 in a home position without the belt transfer means in a sectional view.

The eyelet 150 is formed by a portion of the tension transfer means 136 which encompasses the center 154 of the tension transfer means 136 in the axial direction. Thus, the first and second rope sections each extending from the respective rope end 138, 140 to the eyelet 150 and, resp., the center 154 are substantially equal in length.

The eyelet 150 has a diameter D of 17 mm. In an alternative embodiment, the eyelet 150 may have a diameter D ranging from 2 mm to 30 mm, of preference from 12 mm to 24 mm. In another alternative embodiment, the diameter D of the eyelet 150 may substantially be 0 mm.

The tension transfer means 136 has a rope thickness and, resp., a diameter of 4.3 mm. Alternatively, the tension transfer means 136 may have a diameter ranging from 3 mm to 6 mm.

The deflection unit 120 is arranged to deflect the two rope sections of the tension transfer means 136. For this purpose, the deflection unit 120 may include especially two parallel semi-circular recesses in the circumferential direction on its radial shell surface, each recess providing a guideway for a rope section.

Figure 8:
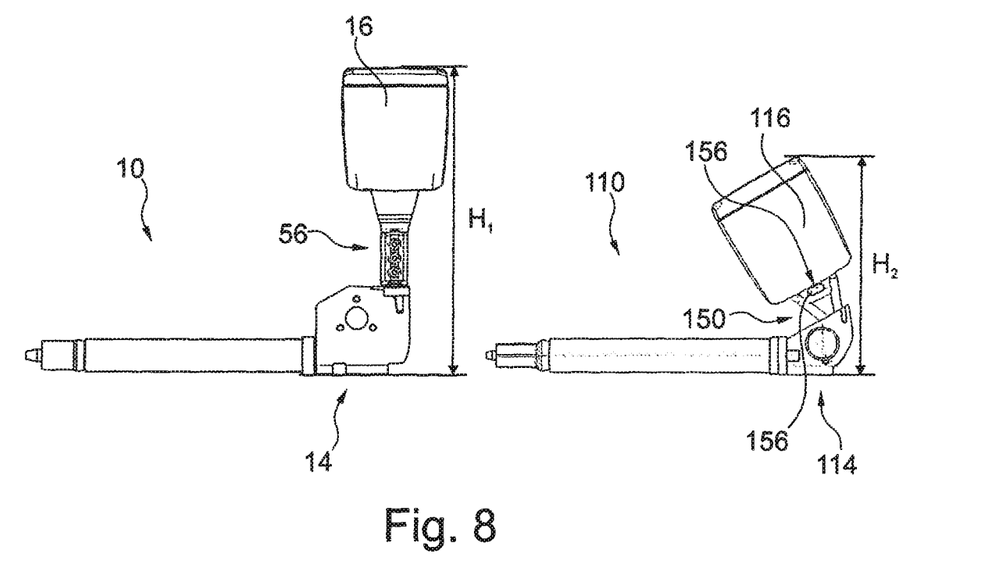
FIG. 8 shows the force limiting device of FIG. 1 and the force limiting device of FIG. 6 in a joint side view.

The belt transfer means 116 is fastened to the eyelet 150, as the tension transfer means 136 extends through the belt transfer means 116 at least in portions at a fastening portion 156 (cf. FIG. 8).

The fastening portion 156 includes a bolt 158 extending through the eyelet 150, thereby coupling the belt transfer means 116 captively to the tension transfer means 136.

The belt transfer means 116 may further be fastened to the tension transfer means 136, especially to the center 154, by force, form and/or adhesive closure, for example.

Alternatively, the belt transfer means 116 may be movably fastened to the tension transfer means 136, especially along the axial expansion of the tension transfer means 136. In this way, the orientation of the belt transfer means 116 may be varied by shifting along the tension transfer means 136. This is especially possible even if the tension transfer means 136 and/or the eyelet 150 has/have high rigidity.

The diameter of the tension transfer means 136 which is reduced as compared to the tension transfer means 36 of the force limiting device 10 enables the design of the deflection unit 120 and the fitting 114 to be compacter than in the force limiting device 10 (see FIG. 8).

Moreover, the fastening portion 156 of the belt transfer means 116 is substantially smaller than the fastening portion 56 of the force limiting device 10 which encompasses the rope end 38 in the axial direction.

In this way, the force limiting device 10 has a height $H_1$ of 145 mm, whereas in the second embodiment the force limiting device 110 merely has a height $H_2$ of 104 mm and thus exhibits a compacter design.

In the case of use of the seat belt, the force limiting device 110 behaves analogously to the force limiting device 10, with the tensile force pulling the force transfer means 116 in the direction Z acting on the displacing unit 126 via both of the rope ends 138, 140 of the tension transfer means 136. Accordingly, the force is substantially evenly distributed to the two rope sections of the double rope pull 152, thus allowing each rope section to be loaded by only about half of the tensile force. In this way, the tension transfer means 136 may be provided to be thinner and/or designed for a lower load.

The force limiting device 110 exhibits all benefits of the force limiting device 10 and further offers the advantages of being designed in an even compacter manner. In this way, the force limiting device 110 requires especially little space, has especially little mass and can be manufactured at especially low cost.

The invention claimed is:

1. A force limiting device (10, 110) for a seat belt, comprising:
    a tension transfer means (36, 136);
    a fitting (14, 114) comprising a deflection unit (20, 120) in the form of a deflection pulley for the tension transfer means (36, 136); and
    a deformation member (12) fastened directly to the fitting (14, 114) and comprising a displacing unit (26, 126), the displacing unit (26, 126) being adapted to move toward the fitting (14, 114) to plastically deform a portion of the deformation member (12).

2. The force limiting device according to claim 1, wherein the deformation member (12, 112) further comprises a deformation tube (22, 122), the displacing unit (26, 126) being connected to the tension transfer means (36, 136) and being adapted to penetrate the deformation tube (22, 122) while plastically deforming the deformation tube (12, 122).

3. The force limiting device according to claim 2, wherein the deformation tube (22, 122) includes a first end (24, 124) having an extension (48) and a second end (28, 128) by which it is connected to the fitting (14, 114), and wherein the displacing unit (26, 126) acts upon the extension (48) in the non-deformed state of the deformation tube (22, 122).

4. The force limiting device according to 3, wherein the tension transfer means (36, 136) extends through the deformation tube (22, 122).

5. The force limiting device according to claim 1, wherein the tension transfer means (36, 136) is a pull rope.

6. The force limiting device according to claim 2, wherein the force limiting device (10, 110) includes a belt transfer means (16, 116), with the deformation tube (22, 122) being arranged coaxially relative to the belt transfer means (16, 116).

7. The force limiting device according to claim 2, wherein the force limiting device (10, 110) includes a belt transfer means (16, 116), and wherein the deformation tube (22, 122) is arranged at an angle α ranging from 30° to 120° with the belt transfer means (16, 116).

8. The force limiting device according to claim 1, wherein the tension transfer means (136) is a pull rope and forms an eyelet (150) at which a belt transfer means (116) is fastened.

9. The force limiting device according to claim 2, wherein a first rope end (138) and a second rope end (140) of the tension transfer means (136) are fastened directly to the displacing unit (126).

10. The force limiting device according to claim 2, wherein the deformation tube (22, 122) is in the form of a chamber-pressed and subsequently drawn tube.

11. The force limiting device according to claim 7, wherein the angle α is 90°.

12. The force limiting device according to claim 1, wherein the displacing unit (26, 126) is connected to the tension transfer means (36, 136) and adapted to be moved by the tension transfer means (36, 136) toward the fitting (14, 114) to plastically deform a portion of the deformation member (12).

13. A force limiting device (10, 110) for a seat belt, comprising:
    a tension transfer means (36, 136);
    a fitting (14, 114) comprising a deflection unit (20, 120) in the form of a deflection pulley for the tension transfer means (36, 136); and
    a deformation member (12) fastened directly to the fitting (14, 114) and comprising a displacing unit (26, 126), the displacing unit (26, 126) being connected to the tension transfer means (36, 136) and adapted to be moved by the tension transfer means (36, 136) to plastically deform a portion of the deformation member (12).

14. The force limiting device according to claim 13, wherein the deformation member (12, 112) further comprises a deformation tube (22, 122), the displacing unit (26, 126) being adapted to be moved by the tension transfer means (36, 136) to penetrate the deformation tube (22, 122) while plastically deforming the deformation tube (12, 122).

15. The force limiting device according to claim 14, wherein the deformation tube (22, 122) includes a first end (24, 124) having an extension (48) and a second end (28, 128) by which it is connected to the fitting (14, 114), and wherein the displacing unit (26, 126) acts upon the extension (48) in the non-deformed state of the deformation tube (22, 122).

16. The force limiting device according to 14, wherein the tension transfer means (36, 136) is a pull rope that extends through the deformation tube (22, 122).

17. The force limiting device according to claim 14, wherein the force limiting device (10, 110) includes a belt transfer means (16, 116), with the deformation tube (22, 122) being arranged coaxially relative to the belt transfer means (16, 116).

18. The force limiting device according to claim 14, wherein the force limiting device (10, 110) includes a belt transfer means (16, 116), and wherein the deformation tube (22, 122) is arranged at an angle α ranging from 30° to 120° with the belt transfer means (16, 116).

19. The force limiting device according to claim 13, wherein the tension transfer means (136) is a pull rope and forms an eyelet (150) at which a belt transfer means (116) is fastened.

20. The force limiting device according to claim 13, wherein a first rope end (138) and a second rope end (140) of the tension transfer means (136) are fastened directly to the displacing unit (126).

* * * * *